Sept. 3, 1957 J. H. CUTHBERT 2,805,273
INSTRUMENT MOUNTING
Filed July 1, 1955
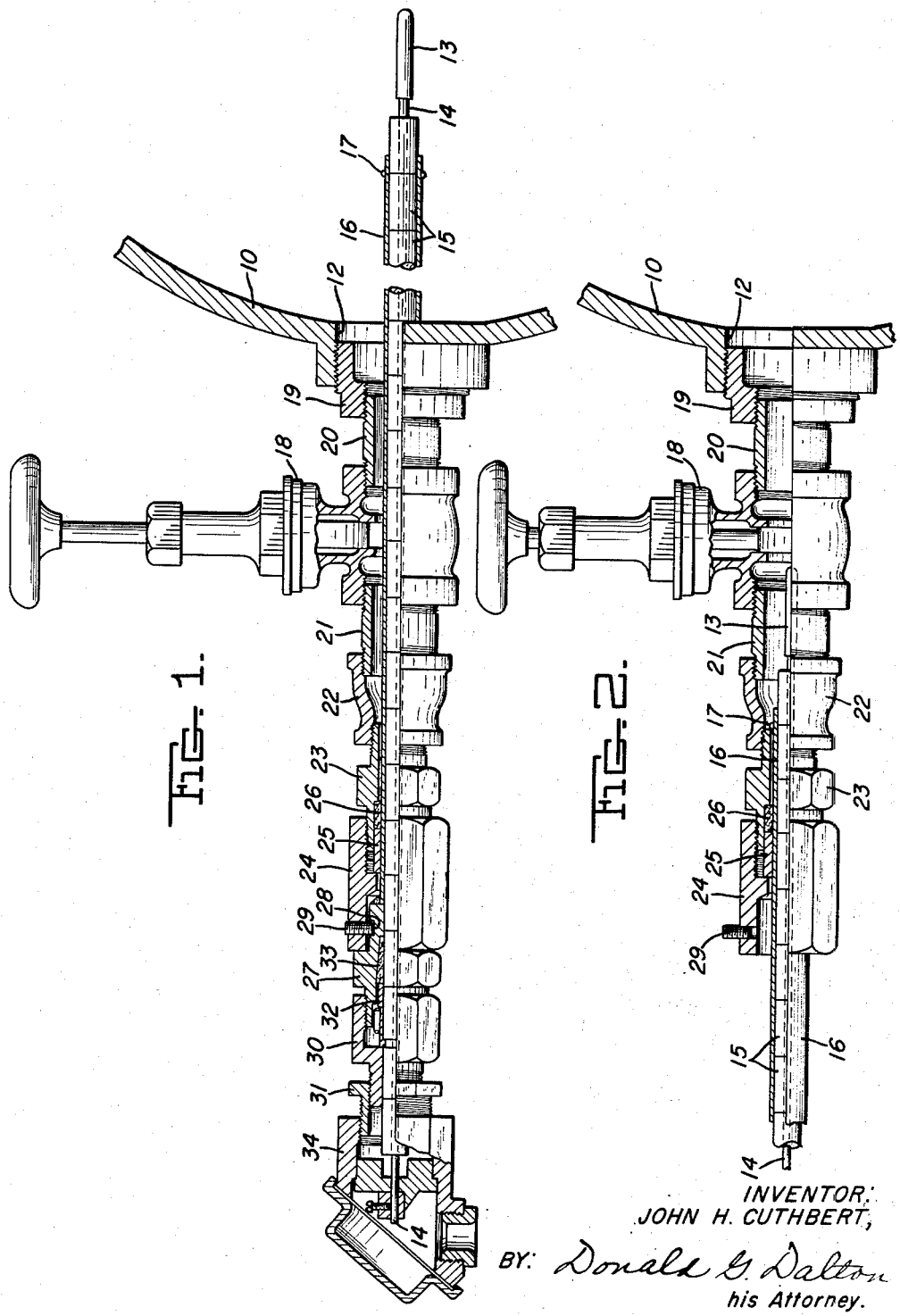
INVENTOR:
JOHN H. CUTHBERT,
BY: Donald G. Dalton
his Attorney.

United States Patent Office 2,805,273
Patented Sept. 3, 1957

2,805,273

INSTRUMENT MOUNTING

John H. Cuthbert, Chicago, Ill., assignor to United States Steel Corporation, a corporation of New Jersey Application July 1, 1955, Serial No. 519,510

1 Claim. (Cl. 136—4)

This invention relates to an improved mounting for instruments installed in pressurized chambers.

My mounting is especially suited for thermocouples installed in hot-blast mains which lead to a blast furnace, although obviously the invention is not thus limited. Such mains commonly carry air at a temperature of 1200 to 1500 F. and under a pressure of about 25 p. s. i. g. Conventionally before a thermocouple can be removed therefrom for repair or replacement, the blast must be shut off. This practice may take the main out of service for an undesirably long period. In some stages of blast furnace operation, the blast cannot be shut off until casting is completed. If a thermocouple fails at such a stage, the operator has no control of the blast temperature, which is a critical factor in operation of the furnace.

An object of the present invention is to provide an improved mounting which allows an elongated instrument such as a thermocouple to be installed or removed from a pressurized chamber without disturbing the pressure therein.

A further object is to provide an improved mounting in which the instrument is reciprocably movable and which includes a normally open valve that can be closed to seal the chamber when the instrument is withdrawn.

In accomplishing these and other objects of the invention, I have provided improved details of structure, a preferred form of which is shown in the accompanying drawing, in which:

Figure 1 is a side elevation, partly in section, of my improved mounting with the instrument in place in a pressurized chamber; and Figure 2 is a view similar to Figure 1, but with the instrument withdrawn.

Figure 1 shows a portion of a pressurized chamber 10 which has an opening 12 for insertion of an instrument 13. In the illustration the chamber is a hot blast main and the instrument is a conventional thermocouple, which includes the usual pair of dissimilar metal wires 14 and abutting ceramic insulator sleeves 15 surrounding said wires. The sleeves 15 are housed within a protective metal tubing 16, the exterior of which carries a fixed stop ring 17 adjacent its inner end.

In accordance with my invention, a conduit which contains a gate valve 18 is fixed to the chamber 10 at its opening 12. The conduit illustrated includes a pipe bushing 19 threadedly engaged with the chamber, a nipple 20 connected between the bushing and valve, and a nipple 21 connected to the valve on the other side. The valve is normally open, and the tubing 16 of the instrument 13 extends loosely through the conduit into the chamber 10. The nipple 21 carries a pipe reducer 22, which in turn detachably carries an adjusting nut 23. This nut constitutes a second conduit whose bore is of smaller diameter than that of the first. The second conduit closely receives the tubing 16 and its outer portion provides space for a pressure seal. This seal includes a gland housing 24 threadedly engaged with the exterior of the nut 23, a gland 25 within said gland housing and nut and slidably receiving the tubing 16, and packing 26 compressed between said gland and nut. A coupler housing 27 is welded to the outer end of the tubing 16 and has a circumferential groove 28. A set screw 29 is threadedly engaged with the gland housing 24 and projects into the groove 28 to hold the instrument in the mounting.

The parts located outwardly of the coupler housing 27 can be of any desired construction suitable for the purpose. In the construction illustrated the outside of the housing carries a nut 30, which in turn carries a pipe bushing 31. The interior of the housing 27 contains an annular plug 32 and a paste seal 33. The bushing 31 carries a weather head 34 into which the outermost insulator sleeve 15 of the thermocouple extends.

To remove the instrument 13 from the mounting, the set screw 29 is turned until it disengages the coupler housing 27. The instrument is drawn outwardly through the valve 18, nipples 20 and 21, pipe reducer 22, adjusting nut 23 and gland housing 24 until the stop ring 17 abuts the inner end of the adjusting nut 23. The packing 26 continues to provide the necessary seal against escape of gases from the chamber 10. The parts are proportioned so that the inner end of the instrument clears the closure of the valve 18 when the ring 17 abuts the nut 23; that is, the distance between the inner end of the nut and the valve exceeds that between the ring and the end of the instrument, as Figure 2 shows. Next the valve 18 is closed to seal the chamber, after which the adjusting nut 23 can be detached from the pipe reducer 22 to complete the removal of the instrument. The reverse of the procedure is followed when the instrument is installed in the chamber.

From the foregoing description it is seen that the present invention affords a structurally simple mounting for instruments in pressurized chambers. The use of a gate valve in the mounting enables the instrument to be removed or installed without disturbing pressure conditions inside the chamber.

While I have shown and described only a single embodiment of my invention, it is apparent that modifications may arise. Therefore, I do not wish to be limited to the disclosure set forth but only by the scope of the appended claims.

I claim:

The combination, with a chamber adapted to contain fluid under pressure and a thermocouple installed in said chamber, said thermocouple including dissimilar metal elements, a series of abutting ceramic sleeves around said elements, an elongated metal protective tubing which houses said sleeves, and a stop ring fixed to the outside of said tubing adjacent its inner end, of a mounting for said thermocouple enabling it to be removed without disturbing pressure in said chamber, said mounting comprising a first conduit fixed to said chamber and communicating with the interior, a gate valve in said first conduit, a second conduit detachably connected to said first conduit outwardly of said valve and having a smaller bore, said tubing extending through both said conduits and being loosely received in the first and closely received in the second and being reciprocably movable with respect to the conduits, said ring being freely movable through said first conduit but adapted to abut the end of the second conduit to limit outward movement of the thermocouple, packing in the outer end portion of said second conduit surrounding said tubing, a gland extending within said second conduit and compressing said packing, a gland housing fixed to the end of said second conduit and acting against said gland, a coupler housing fixed to said tubing, and a fastener detachably fixing said coupler housing to said gland housing to hold said thermocouple within said conduits and chamber, the distance between said valve and the inner end of said second conduit exceeding the distance between said ring and the inner extremity of the thermocouple to enable said valve to close when the ring engages the inner end of the second conduit.

References Cited in the file of this patent

UNITED STATES PATENTS

| | | |
|---|---|---|
| 1,683,489 | Rice | Sept. 4, 1928 |
| 1,991,371 | Blanckenburg | Feb. 19, 1935 |
| 2,171,576 | Larry et al. | Sept. 5, 1939 |
| 2,655,339 | Smith | Oct. 13, 1953 |